Aug. 22, 1939.  Z. E. FLICK  2,170,134
BEARING SEAL
Filed Oct. 26, 1936  2 Sheets-Sheet 1
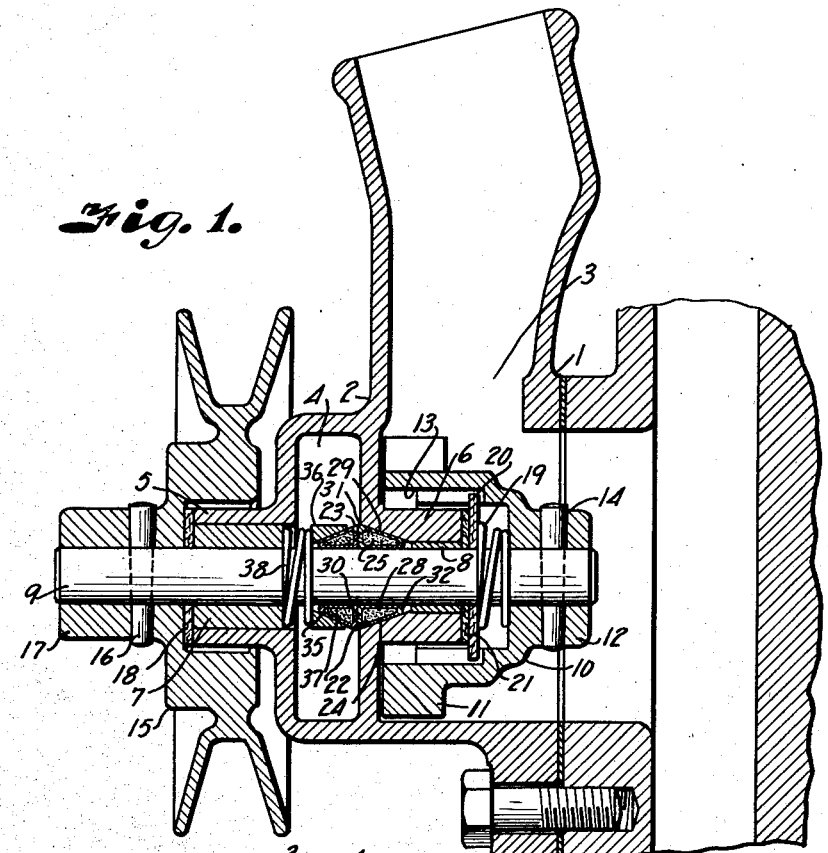
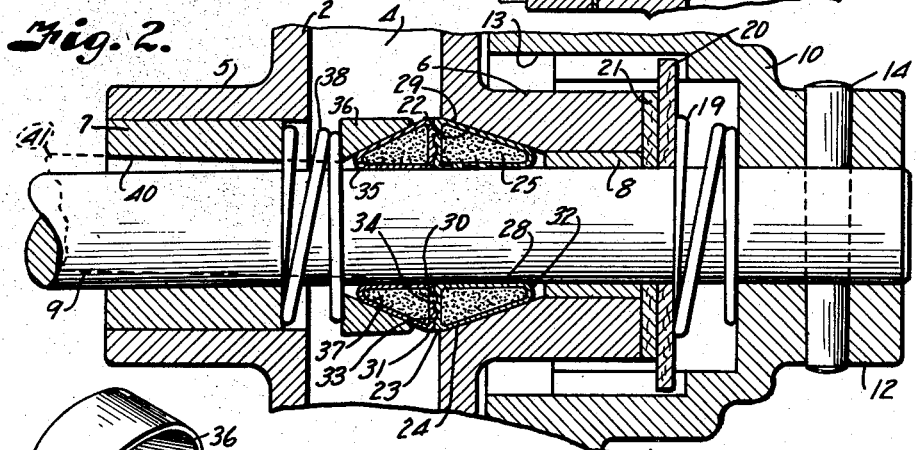
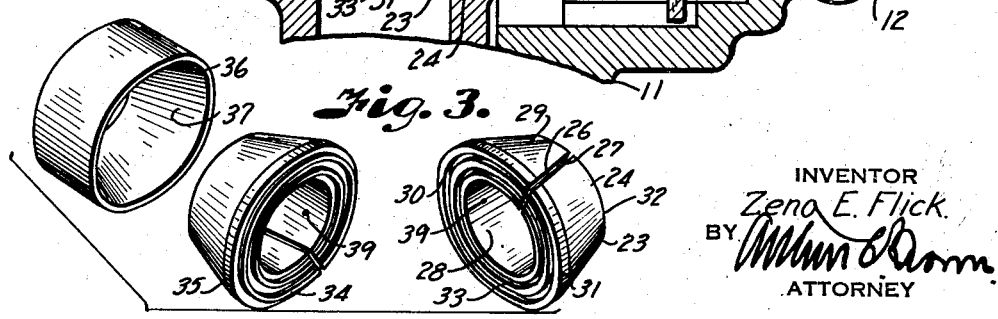
INVENTOR
Zena E. Flick.
BY
ATTORNEY Aug. 22, 1939.   Z. E. FLICK   2,170,134
BEARING SEAL
Filed Oct. 26, 1936   2 Sheets-Sheet 2
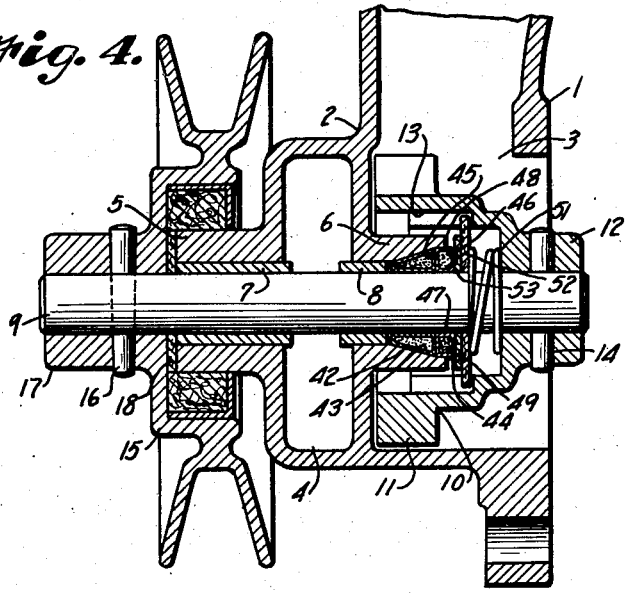
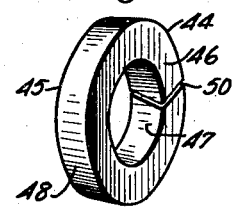
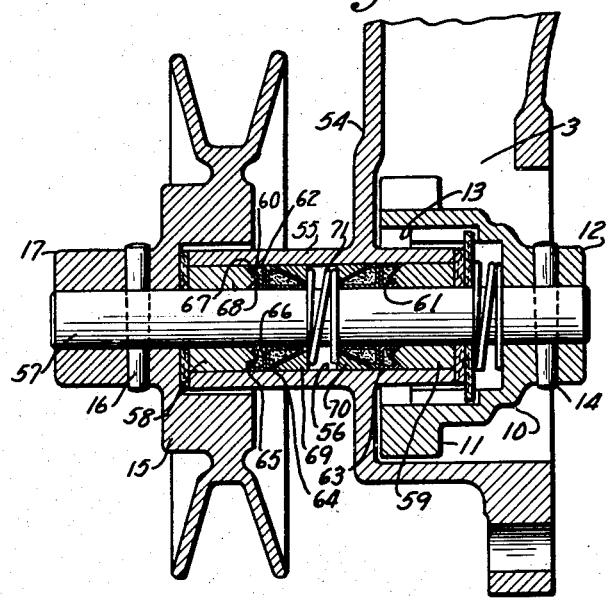
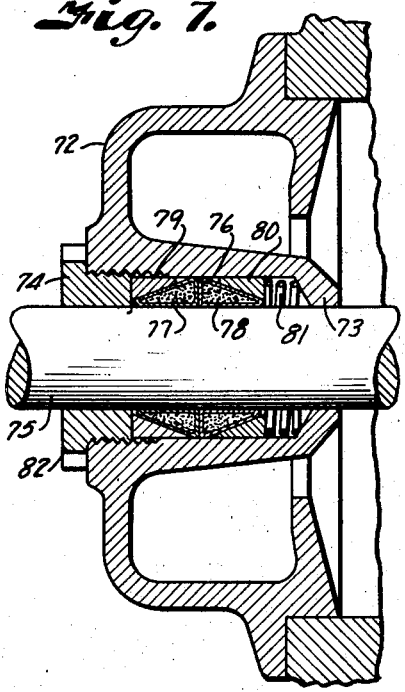
INVENTOR
Zeno E. Flick.
BY
ATTORNEY Patented Aug. 22, 1939

2,170,134

UNITED STATES PATENT OFFICE 2,170,134

BEARING SEAL

Zeno E. Flick, Jackson, Mich.

Application October 26, 1936, Serial No. 107,521

3 Claims. (Cl. 286—30)

This invention relates to a combination bearing and mechanical seal such as used in sealing the shafts of pumps, valve stems, etc., and has for its principal objects to provide a seal of this character that is self-adjusting and which effectively seals the inner surface of the bearing chamber as well as the periphery of the shaft.

Further objects of the invention are to provide a mechanical seal consisting of a pliant shell containing a lubricant impregnated core so shaped that it is readily brought to the exact contour of the chamber in which it is installed; and to provide a positive seal on all sides of the packing to prevent leakage and infiltration of air when the shaft and bearing have become worn with use.

Another important object of the invention is to provide a seal that is not broken when lubricant is injected into the bearing under pressure of a grease gun.

In accomplishing these and other objects of the invention, as hereinafter pointed out, I have provided improved details of structure, the preferred forms of which are illustrated in the accompanying drawings, wherein:

Fig. 1 is a section through a pump equipped with a packing or mechanical seal embodying the features of the present invention.

Fig. 2 is an enlarged section through the pump illustrating maintenance of the seal after the shaft and bearing have worn.

Fig. 3 is a detail perspective view of the sealing elements and follower ring.

Fig. 4 is a section through a pump equipped with a modified form of the present invention.

Fig. 5 is a perspective view of the flat sealing ring employed in the form of the invention illustrated in Fig. 4.

Fig. 6 is a section through a pump equipped with a further modified form of seal.

Fig. 7 is a section through a portion of a pump equipped with a still further modified form of the invention.

Referring more in detail to the drawings:

1 designates a pump including a casing 2 having a rotor chamber 3, and a lubricant containing chamber 4. Formed on the casing at opposite sides of the lubricant containing chamber 4 are bearings 5 and 6 provided with bushings 7 and 8 to rotatably mount a shaft 9. The inner end of the shaft 9 projects within the rotor chamber and carries a rotor 10 having impeller blades 11. The rotor includes a central hub portion 12 having a recess 13 to accommodate a bearing 6. The rotor is secured to the shaft by a pin 14, as in conventional practice. The outer end of the shaft projects from the bearing 5 and carries a drive pulley 15 that is keyed thereto by a pin 16 extending through the hub 17 of the pulley and through the shaft as shown in Fig. 1.

Mounted between the ends of the bearing 5 and the hub of the pulley 15 is a thrust washer 18 to normally prevent leakage of lubricant from the chamber 4 out of the outer end of the bearing. The hub of the pulley is yieldingly retained in contact with the bearing and the blades of the impeller out of contact with the casing by means of a coil spring 19 having one end bearing against the bottom of the recess 13 and its other end bearing against a washer 20 having driving relation with the rotor and bearing contact with a washer 21 seating against the end of the bearing 6.

The construction just described is that of a well-known pump and specifically forms no part of the present invention which has to do with sealing of the shaft and bearing 6 to prevent leakage of fluid being moved by the rotor as now to be described.

In the present invention the end of the bearing 6 adjacent the lubricant containing chamber 4 is counter-bored to provide a conical shaped recess or seat 22 having its peripheral face tapering inwardly in the direction of a shaft and toward the bushing 8 to accommodate a packing ring 23. The packing ring 23 includes a pliant metallic shell 24 formed from extruded formative metal, such as lead, a lead alloy, or similar soft non-ferrous metal, that may be preliminarily formed as a cylindrical, tubular sheath covering a lubricant impregnated core 25, cut into sections and rolled to form rings of desired diameters. These preliminarily shaped rings are then transformed as by spinning to provide the conical shaped packing rings as clearly illustrated in Figs. 1 to 3. The ends 26 and 27 of the rings are preferably cut at an angle relatively to the longitudinal axis of the shaft as shown in Fig. 3. When thus shaped the packing ring 23 has an inner cylindrical wall 28 substantially conforming to the diameter of the shaft 9 and an outer conical wall 29 conforming to the taper of the conical recess or seat 21 and which connects at the base thereof with the cylindrical wall 28 by an annular wall 30 extending in a plane at right angles to the axis of the shaft.

The juncture of the conical wall with the wall 30 may be slightly flattened, as at 31, and of suitable diameter to conform to the outer diameter of the conical recess. The juncture of the conical wall with the opposite end of the cylindrical wall may be slightly rounded as indicated at 32. The outer face of the wall 30 is provided with annular grooves 33 to closely engage complementary ribs 34 on a shaft sealing ring 35. The ring 35 conforms to the construction of the ring 23 and is arranged on the shaft reversely thereto so that the walls forming the base portions thereof are in abutting sealing contact with each other.

In order to retain the ring 35 in sealing contact with the ring 23 and the ring 23 in sealing engagement with the conical face of the recess or seat 22, the conical wall portion of the ring 35 is engaged by a follower ring 36, loosely encircling the shaft 9 and having an inner conical seat 37 corresponding to the conical taper of the ring as clearly shown in Fig. 2. The follower ring is urged in pressing engagement with the ring 35 by a coil spring 38 sleeved over the shaft and having one end bearing against the follower ring and the opposite end against the bushing 7.

When the seal is assembled as described the spring exerts sufficient force against the follower ring to urge the cylindrical wall portion 28 of the ring 35 into sealing engagement with the shaft to prevent leakage from the pump and filtration of air through the bearing 6. The ring 35 is also urged into sealing engagement with the base wall of the ring 23 and the ring 23 into sealing engagement with the conical face of the recess 22, at the same time contracting the cylindrical wall portion 28 into sealing engagement with the shaft. The spring 38 is so constructed that it has sufficient power to effect seal of the rings without interfering with free rotation of the shaft. If desired the inner cylindrical wall of the rings may be provided with apertures 39 to allow escape of lubricant from the core to lubricate the surfaces of the rings bearing against the shaft and to supply lubricant to the bearing surface of the bushing 8. The interengaging ribs and grooves at the base portions of the rings not only enhance the seal therebetween but prevent relative rotation of the rings.

After the pump has been in service the outer shaft and bushing 7 tend to wear, as illustrated at 40 in Fig. 2, so that the shaft is not maintained in concentric relation but tends to wabble as shown by the dotted lines 41. When this occurs the seal between the cylindrical wall portion of the ring 23 and the shaft may be broken incidental to wear but should this occur, the cylindrical wall portion of the ring 35 maintains its sealing contact with the shaft to stop any leakage that might occur between the shaft and the ring 35. The ring 35 will shift slightly with wabbling of the shaft but the spring maintains sealing contact of the base portions of the rings and the wedging action of the follower ring urges the ring 35 into sealing contact with the shaft. The pressure acting against the ring 23 is sufficient to maintain seal of the conical surface thereof with the conical recess to prevent leakage at the outer periphery of the seal. It is thus obvious that a positive seal is maintained on all sides even after the shaft and its supporting bushings have become worn as shown in Fig. 2.

Attention is directed to the fact that the rings 23 and 35 are so applied that the slit ends thereof are in offset relation so as to prevent possible leakage directly through the slits thereof.

In the form of the invention illustrated in Fig. 4 the bearing 6 is provided with a conical recess 42 at the end opposite the lubricant containing chamber 4 and mounted in the recess is a conical sealing ring 43 conforming to the construction of the sealing rings 23 and 35 in the first form of the invention. The cooperative sealing ring 44, however, is of washer-like shape and consists of a shell having parallel, annular side walls 45 and 46 connected by inner and outer cylindrical walls 47 and 48 to enclose a lubricant impregnated core 49, the ring being slit as at 50, similar to the conical packing rings. The cooperating ring 44 is sleeved on the shaft in abutting relation with the split portion thereof in offset relation with the split portion of the conical ring. The ring 44 is urged against the concial ring to maintain seal thereof by a coil spring 51 having one end bearing against the bottom of the recess in the rotor and its other end bearing against the follower disk 52 having driving connection with the rotor. The follower ring in turn bears against a washer 53 that is sleeved on the shaft to abut against the wall 46 of the flat sealing ring. The spring 51 and disk 52 therefore rotate with the rotor, with the disk 52 bearing against the washer 53 to prevent wear on the washer-like sealing ring.

In the form of the invention illustrated in Fig. 6 the pump casing 54 has a bearing 55 provided with a bore 56 of larger diameter than the pump shaft 57 to accommodate bushings 58 and 59 that are pressed within the respective ends of the bore, the bushings having bearing openings of suitable diameter to rotatably mount the shaft. The inner or facing ends of the bushings have V-shaped ribs 60 and 61 respectively to seat sealing rings 62 and 63. The sealing rings 62 and 63 are of the same construction and each includes a metallic shell of pliant character and has a flat annular wall 64 and a V-shaped annular wall 65 connected by inner and outer cylindrical walls 66 and 67 to enclose a lubricant impregnated core 68 similar to the rings illustrated in Fig. 5. The V-shaped wall seats against the V-shaped ribs on the bushings to effect a seal therewith as clearly shown in the drawings. Abutting against the sealing rings just described are conical sealing rings conforming to the conical sealing rings in the other forms of the invention. The conical sealing rings are urged into engagement with the shaft and with the grooved sealing rings by follower rings 69 and 70 that are urged apart by the action of a coil spring 71 sleeved over the shaft and having its ends bearing against the respective rings.

In the form of the invention illustrated in Fig. 7 the pump casing 72 has a bearing opening 73 cooperating with a bearing opening in a nut 74 to rotatably mount the shaft 75. Formed within the casing between the bearing opening 73 and the packing nut is a chamber 76 for accommodating conical sealing rings 77 and 78 arranged with the base portions thereof in abutting relation as in the instance of the sealing rings in the first form of the invention. The conical portions of the sealing rings are engaged by follower rings 79 and 80 respectively seating against the nut 74 and against one end of a coil spring 81 sleeved over the shaft and having its other end bearing against the bottom of the chamber. The nut 74 has a flange 82 that is drawn against the face of the casing to limit rotation thereof, however, when the nut is drawn tightly against the casing there is sufficient play in the spring to automatically maintain sealing pressure on the conical sealing rings. In this form of the invention the cylindrical wall portion of the sealing rings are urged in sealing engagement with the periphery of the shaft and the juncture of the base portions into sealing engagement with the inner periphery of the chamber so as to prevent leakage interiorly and exteriorly of the sealing rings.

From the foregoing it is obvious that I have provided a seal which effectively seals the bearing chamber as well as the shaft that is rotatably mounted therein. It is also obvious that with the separate seals, one sealing against the bearing chamber and the other against the shaft, a positive seal is maintained, even should the shaft or its bearings become worn. Attention is directed to the fact that the sealing rings not only effectively seal the shaft but they form lubricated bearing surfaces to supplement the effective bearing surfaces supporting the shaft. Also since the sealing rings include the pliant metallic shells, they are readily adapted to self-adjustment and alignment in case they should become distorted during their insertion, the action of the spring and conical seats being sufficient pressure to reestablish the shape of the rings.

What I claim and desire to secure by Letters Patent is:

1. In a bearing seal a pair of sealing rings each including a metallic shell having an annular base wall, a conical shaped peripheral wall integrally connected with the outer periphery of the annular base wall and a cylindrical wall integrally connecting the base and peripheral walls to form a closed annular chamber, and a lubricant impregnated material contained in said chamber, said rings being arranged with the base walls in abutting contact.

2. In a shaft supporting bearing having a chamber provided with a conical seat, a pair of sealing rings each including a shell having a base wall, a conical peripheral wall and a connecting cylindrical wall, a lubricant impregnated material enclosed by said walls, said sealing rings being arranged with the base walls in abutting relation and with the conical wall of one of the rings engaged in said conical seat of the shaft supporting bearing, a loosely supported follower ring having a conical seat for engaging the conical wall of the other sealing ring, and a spring engaging the follower ring to contract the sealing rings about a shaft extending through the bearing, said abutting walls raving interengaging sealing means on their abutting faces to prevent relative rotation of the rings.

3. In a shaft supporting bearing having a packing chamber provided with a conical seat, a pair of split sealing rings each including a shell having a base wall, a conical peripheral wall and a connecting cylindrical wall, a lubricant impregnated material enclosed by said walls, said sealing rings being arranged with the base walls in abutting relation and with the conical wall of one of the rings engaged in said conical seat of the shaft supporting bearing, a loosely supported follower ring having a conical seat for engaging the conical wall of the other sealing ring, and a spring engaging the follower ring to contract the sealing rings about a shaft extending through the bearing, said abutting walls having interengaging means on their abutting faces to retain the split portions of the rings in staggered relation with each other.

ZENO E. FLICK.